UNITED STATES PATENT OFFICE.

HARRY P. BASSETT, OF BALTIMORE, MARYLAND, ASSIGNOR TO THE SPAR CHEMICAL COMPANY, OF BALTIMORE, MARYLAND, A CORPORATION OF MARYLAND.

PROCESS OF OBTAINING POTASH SALTS FROM FELDSPAR.

1,072,686.                    Specification of Letters Patent.        Patented Sept. 9, 1913.

No Drawing.             Application filed June 22, 1911.  Serial No. 634,779.

*To all whom it may concern:*

Be it known that I, HARRY P. BASSETT, a citizen of the United States, residing at Baltimore, in the State of Maryland, have invented certain new and useful Improvements in Processes of Obtaining Potash Salts from Feldspar, of which the following is a specification.

This invention relates to the treatment of feldspar or feldspathic rock to obtain potash therefrom and has particular reference to a process of not only obtaining potash salts from feldspar or feldspathic rock but of securing as a byproduct, a material adapted without further treatment, for use in the manufacture of pottery and for other purposes.

Heretofore feldspar or feldspar bearing rock has been treated at an elevated temperature with various mixtures of salt and other reagents, notably with salt and lime and with salt and sodium acid sulfate; but these processes are much more expensive and in the case of the salt and lime process the potash salts are not obtained in a pure condition while in both the lime and salt process and the sodium acid sulfate and salt process the residue is not obtained in the pure condition, for various reasons notably in the lime and salt process the residue is chemically altered by the introduction of calcium into the residue while in the lime and salt process as well as in the sodium acid sulfate process the iron is not removed, the removal of iron being one of the main features of my improved process.

Now I have discovered that potash can be economically and satisfactorily obtained from feldspar and feldspar bearing rock by treatment with salt alone and that the potash salts and byproducts of the reaction can be obtained in relatively pure form.

In the practice of my process I add to disintegrated and preferably finely ground feldspar or feldspar bearing rock, about one half of its weight of sodium chlorid and heat the mixture to a yellow heat in the presence of air, preferably from 800 to 900° C., for about one to two hours. The mass is then treated with water preferably by being dumped while still hot, into a vat of water which may advantageously be used in the proportion of about two to five parts by weight of water to one part of the fused mass. The mass is then leached with water and the potash and sodium salts are obtained in any desired manner, preferably by evaporation to dryness. The potassium and sodium salts are later separated, as for example by crystallization. The leached residue which corresponds in composition closely with that of the feldspathic rock under treatment except that the potassium is replaced by sodium and any iron present in the original rock will have been volatilized as iron chlorid and thus removed is then dried and ground, the resulting product being a white mass that may be used for pottery and other purposes such as a paper filler or for making enamel ware. The feldspar or feldspar bearing rock may be ground to any desired fineness before treatment but preferably not less than 40 mesh, and above 100 mesh is unnecessary. The leached residue is dried and ground and is then ready for use.

While I have described the preferred reagents and proportions employed in my process, it is to be understood that chemical equivalents of such reagents may be employed and that the proportions in which they are brought together may be, widely varied within the spirit of my invention and without departing from the scope of the appended claims.

Having thus described my invention, I claim:—

1. The herein described process which consists in adding sodium chlorid to feldspar or similar potassium containing rock, heating the mixture in the presence of air without the addition thereto of lime or other calcium containing compound to a reacting temperature to render the potassium salts present soluble in water and dissolving out the potassium salts with water.

2. The herein described process which consists in adding sodium chlorid to feldspar or similar potassium containing rock in the proportions of approximately one part by weight of sodium chlorid to two parts by weight of feldspar or similar potassium containing rock, heating the mixture in the presence of air without the addition thereto of lime or other calcium containing compound to a reacting temperature to render the potassium salts soluble in water and dissolving out the potassium salts with water.

3. The herein described process which consists in adding sodium chlorid to feldspar or similar potassium containing rock in the approximate proportions of one part by weight of sodium chlorid to two parts by weight of feldspar or similar potassium containing rock, heating the mass in the presence of air without the addition thereto of lime or other calcium containing compound to a yellow heat, bringing the mass while still hot in contact with water, leaching said mass with water, and recovering the potassium salts from the leachings, substantially as described.

In testimony whereof I affix my signature in presence of two witnesses.

HARRY P. BASSETT.

Witnesses:
C. W. PARKER,
JAMES L. CRAWFORD.